United States Patent
Kasai et al.

(10) Patent No.: US 12,083,767 B2
(45) Date of Patent: Sep. 10, 2024

(54) LONG FILM, METHOD FOR PRODUCING LONG FILM, METHOD FOR PRODUCING LONG MULTILAYER BODY, AND LONG MULTILAYER BODY

(71) Applicant: AGC Inc., Tokyo (JP)

(72) Inventors: Wataru Kasai, Tokyo (JP); Yuya Horiguchi, Tokyo (JP); Seigo Kotera, Tokyo (JP); Tomoya Hosoda, Tokyo (JP)

(73) Assignee: AGC Inc., Tokyo (JP)

( * ) Notice: Subject to any disclaimer, the term of this patent is extended or adjusted under 35 U.S.C. 154(b) by 74 days.

(21) Appl. No.: 17/562,167

(22) Filed: Dec. 27, 2021

(65) Prior Publication Data
US 2022/0118742 A1    Apr. 21, 2022

Related U.S. Application Data

(63) Continuation of application No. PCT/JP2020/026513, filed on Jul. 7, 2020.

(30) Foreign Application Priority Data

Jul. 10, 2019 (JP) ................................. 2019-128118
Jul. 10, 2019 (JP) ................................. 2019-128119
Oct. 28, 2019 (JP) ................................. 2019-195429

(51) Int. Cl.
| | | |
|---|---|---|
| B32B 9/00 | (2006.01) | |
| B32B 15/082 | (2006.01) | |
| B32B 27/30 | (2006.01) | |
| B32B 27/32 | (2006.01) | |
| C08J 5/18 | (2006.01) | |

(52) U.S. Cl.
CPC ............ *B32B 15/082* (2013.01); *B32B 27/30* (2013.01); *B32B 27/322* (2013.01); *C08J 5/18* (2013.01);

(Continued)

(58) Field of Classification Search
CPC ............ B32B 15/082; B32B 2264/202; B32B 2264/303; B32B 27/30; B32B 27/322; C08J 5/18

(Continued)

(56) References Cited

U.S. PATENT DOCUMENTS 4,510,300 A † 4/1985 Levy
10,347,392 B2 † 7/2019 Abe
(Continued)

FOREIGN PATENT DOCUMENTS

CN    109312087 A    2/2019
EP    0091766 A2    10/1983
(Continued)

OTHER PUBLICATIONS

International Search Report issued Oct. 6, 2020 in PCT/JP2020/026513, (with English translation), 11 pages.

(Continued)

*Primary Examiner* — Daniel H Miller
(74) *Attorney, Agent, or Firm* — Element IP, PLC

(57) ABSTRACT

As an exemplary configuration, a long film is configured by thermomeltable polymers including a first unit based on tetrafluoroethylene and a second unit based on perfluoro (alkyl vinyl ether), including spherulites of the thermomeltable polymers, wherein radius of each spherulite is 10 μm or less. As another exemplary configuration, a long film is configured by tetrafluoroethylene polymers having a melt flow rate within a range of 5 to 40 g/10 min. The long film is heated at 180° C. for 30 minutes so as to measure the thermal expansion rate, and when letting thermal expansion rate in a first direction, which extends at a 45-degree angle to a melt flow direction be A, and thermal expansion rate in (Continued)

a second direction orthogonal to the first direction be B, A and B are respectively within the range of −2 to +1%, and |A−B| is 1% or less.

15 Claims, 2 Drawing Sheets

(52) U.S. Cl.
CPC .............. *B32B 2264/0228* (2013.01); *B32B 2264/0257* (2013.01); *B32B 2264/202* (2020.08); *B32B 2264/303* (2020.08); *C08J 2327/18* (2013.01); *C08J 2427/12* (2013.01)

(58) Field of Classification Search
USPC ....................................................... 428/408
See application file for complete search history.

(56) References Cited

U.S. PATENT DOCUMENTS

| | | | |
|---|---|---|---|
| 2009/0038821 A1 † | 2/2009 | Sato | |
| 2013/0037754 A1 * | 2/2013 | Abusleme | C08L 27/16 |
| | | | 252/500 |
| 2020/0113048 A1 † | 4/2020 | Kasai | |

FOREIGN PATENT DOCUMENTS

| | | | |
|---|---|---|---|
| EP | 1000976 A1 | | 5/2000 |
| EP | 3489299 A1 | | 5/2019 |
| JP | H0841267 A | | 2/1996 |
| JP | 11-116623 A | † | 4/1999 |
| JP | H11-116623 A | | 4/1999 |
| JP | H11-147291 A | | 6/1999 |
| JP | 2009059690 A | | 3/2009 |
| JP | 2013237730 A | | 11/2013 |
| JP | 2016087799 A | | 5/2016 |
| JP | WO-2016104297 A1 | | 6/2016 |
| JP | 2016198977 A | | 12/2016 |
| JP | WO2019008876 A1 | | 5/2020 |
| TW | 201815568 A | | 5/2018 |
| WO | 2016104297 A1 | † | 6/2016 |

OTHER PUBLICATIONS

Third Party Observation issued Jul. 22, 2022 in European Patent Application No. 20836648.4, 7 pages.
Third Party Observation issued Jul. 25, 2022 in European Patent Application No. 20836648.4, 7 pages.

* cited by examiner
† cited by third party

Long film 12

LONG FILM, METHOD FOR PRODUCING LONG FILM, METHOD FOR PRODUCING LONG MULTILAYER BODY, AND LONG MULTILAYER BODY

TECHNICAL FIELD

The present invention relates to a long film of a specified length, a method for producing a long film, a method for producing a long multilayer body using the long film, and a long multilayer body.

BACKGROUND ART

A multilayer body constituted by a fluororesin film and another base material is used for printed wiring boards, electromagnetic wave shield sheets, lithium-ion battery outer packages, etc., utilizing the properties (heat resistance, electric characteristics, chemical resistance, etc.) of fluorine resin. The multilayer body is produced using a method of superposing a fluororesin film on the surface of a supporting substrate such as metal foil or a polyimide film etc. and laminating them using a heating roller (see Patent Documents 1 and 2).

Patent Documents 1 and 2 respectively disclose the method of temporarily laminating a fluororesin film on a polyimide film so as to obtain a temporary multilayer body, and then laminating metal foil (or a copper-clad multilayer body) on the temporary multilayer body, thereby obtaining a long multilayer body.

Moreover, Patent Document 2 discloses a thermal expansion rate in a suitable flow direction (MD direction) of a tetrafluoroethylene polymer film used in producing the long multilayer body, and thermal expansion rate in an orthogonal direction (TD direction) to the suitable flow direction.

PRIOR ART DOCUMENTS

Patent Documents

Patent Document 1: JP 2016-087799A
Patent Document 2: International Publication 2019-008876

DISCLOSURE OF THE INVENTION

Problems to be Solved by the Invention

While the fluororesin film and the supporting substrate of the temporary multilayer body are sufficiently macroscopically adhered, the present inventors cannot necessarily say that they are sufficiently microscopically adhered, finding that there are cases where some voids are observed. Moreover, if these voids are large during the stage of the temporary multilayer body, it is found that partial detachment and voids between the film and the substrate occur more easily as a result of heating during main lamination. Furthermore, when exposing the obtained long multilayer body to a high temperature atmosphere, it is found that detachment between the film and the substrate further progresses from the above partial detachment and voids as a starting point.

The inventors consider the steps (unevenness) at the borders between crystal parts and amorphous parts of the fluororesin film surface as a cause of the problems described above, and have conducted intensive studies. As a result, it is found that when sizes of spherulites of the fluoropolymers configuring the fluororesin film are within a predetermined range, detachment and generation of voids in the temporary multilayer body and the long multilayer body may be controlled.

The present invention aims to provide a long film including small-sized spherulites, a method for producing a long film, a method for producing a long multilayer body using the long film, and a long multilayer body.

Moreover, the inventors find that remaining distortions of the tetrafluoroethylene polymer film are complex, and that the film has oblique distortions inclining to the flow direction remaining due to a bowing phenomenon during film production, making thermal expansion rates in oblique directions nonuniform.

When producing a long multilayer body from a film having nonuniform thermal expansion rates in the respective oblique directions, it is also found that wrinkles are generated due to oblique distortions, thereby reducing yield. Furthermore, if the long multilayer body is produced from the film, it is found that oblique distortions remain even with the long multilayer body, and thermal shock resistance is reduced, making it easy to be deformed in the oblique direction during processing.

The present invention also aims to provide a long film in which thermal expansion rates in two oblique directions and the difference therebetween are set within a predetermined range, a method for producing the long film, and a method for producing a long multilayer body using the long film.

Means of Solving the Problems

<1> A long film configured by thermomeltable polymers including a first unit based on tetrafluoroethylene and a second unit based on perfluoro (alkyl vinyl ether), including spherulites of the thermomeltable polymers, wherein radius of each spherulite is 10 μm or less.

<2> The long film according to Item <1>, wherein the thermomeltable polymers further configured by a third unit based on monomers having a polar functional group.

<3> The long film according to either Item <1> or Item <2>, wherein the thermomeltable polymers comprise a 2 to 4 mol % unit based on perfluoro (alkyl vinyl ether) as the second unit.

<4> The long film according any one of Item <1> to Item <3>, wherein melt flow rate of the thermomeltable polymers is within a range of 5 to 40 g/10 min.

<5> The long film according any one of Item <1> to Item <4>, wherein haze of the long film 50 μm in thickness is within a range of 1 to 5%.

<6> A long film production method for producing the long film according to any one of Item <1> to Item <5>, using a die coating method; including the steps of: discharging the thermomeltable polymers in a melted state from a die, and heating the melted thermomeltable polymers using a non-contact heating part before making contact with the first cooling roller.

<7> The production method according to Item <6>, wherein when letting temperature of the thermomeltable polymers in the die be X, and temperature of the first cooling roller be Y, X minus Y is 230° C. or greater.

<8> The production method according to either Item <6> or Item <7>, wherein when letting temperature of the thermomeltable polymers in the die be X, and temperature of the non-contact heating part be Z, the absolute value of the result from calculating X minus Z is 70° C. or less.

<9> A long multilayer body production method, including the step of: laminating the long film according to any one of Item <1> to Item <5> and a long substrate at a temperature within a range of 25 to 100° C. so as to obtain a long multilayer body including the long film and the long substrate in this order.

<10> A long multilayer body including the long film according to any one of Item <1> to Item <5> and a conductive metal layer in this order.

<11> A long film configured by tetrafluoroethylene polymers having a melt flow rate within a range of 5 to 40 g/10 min, wherein the long film is heated at 180° C. for 30 minutes so as to measure the thermal expansion rate, and when letting thermal expansion rate in a first direction, which stretches at a 45-degree angle to a melt flow direction, be A, and thermal expansion rate in a second direction orthogonal to the first direction be B, A and B are respectively within the range of −2 to +1%, and the absolute value of the result from calculating A minus B is 1% or less.

<12> The long film according to Item <11>, wherein the tetrafluoroethylene polymers are tetrafluoroethylene polymers including a polar functional group.

<13> A long film production method for producing the long film according to either Item <11> or Item <12>, using a die coating method; including the steps of: discharging the tetrafluoroethylene polymers in a melted state from a die, and heating the melted tetrafluoroethylene polymers using a non-contact heating part before making contact with the first cooling roller.

<14> The production method according to Item <13>, wherein when letting temperature of the tetrafluoroethylene polymers in the die be X, and temperature of the non-contact heating part be Z, the absolute value of the result from calculating X minus Z is 70° C. or less.

<15> A long multilayer body production method, including the step of: laminating the long film according to either Item <11> or Item <12> and a long substrate at a temperature within a range of 25 to 100° C. so as to obtain a long multilayer body including the long film and the long substrate in this order.

Results of the Invention

According to the present invention, a long film and a long multilayer body with excellent adherence and high temperature stability, preferably a long film and a long multilayer body to be used for producing a printed wiring board with excellent solder heat resistance and with which detachment does not occur easily may be obtained. Moreover, according to the present invention, a long film and a long multilayer body to be used for producing a printed wiring board with excellent thermal shock resistance and with which disconnection does not occur easily may be obtained.

DESCRIPTION OF EMBODIMENTS

Figure 1:
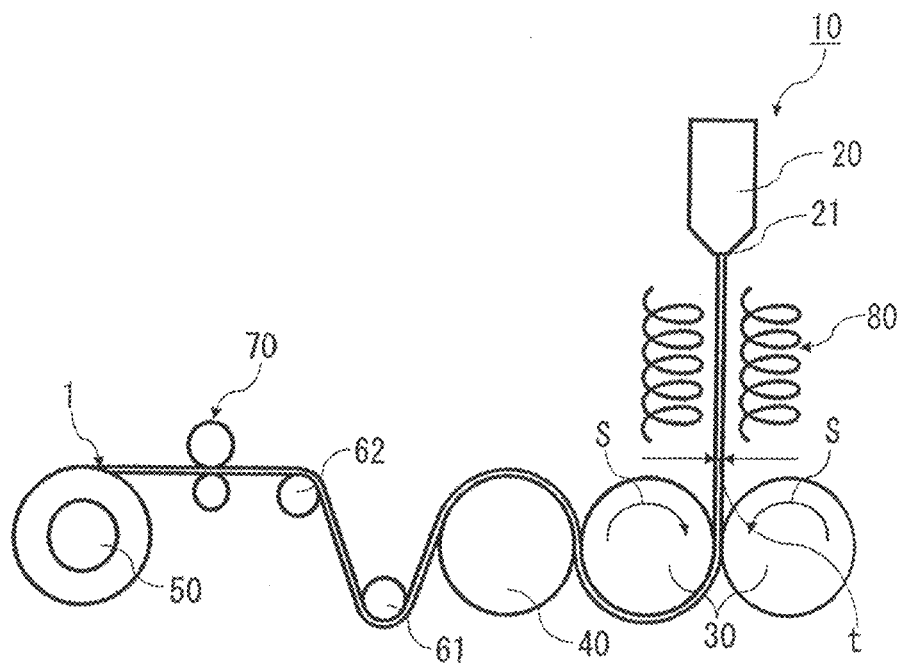
FIG. 1 is a schematic diagram illustrating an embodiment of a long film production apparatus used in main methods 1 and 3.

The terms given below have the following meanings.

'Thermomeltable polymer' means a polymer exhibiting melt fluidity; more specifically, it means a polymer having a melt flow rate within a range of 0.1 to 1000 g/10 min at a temperature 20° C. higher than the melting temperature of the polymer under a load of 49N.

'Melt flow rate (MFR)' means a polymer melt mass flow rate stipulated by JIS K 7210:1999 (ISO 1133:1997).

'Polymer melting temperature (melting point)' is a temperature corresponding to the maximum value of polymer melting peaks measured using a differential scanning calorimetry (DSC) method.

'Water absorption of a substrate' is a value measured using a method stipulated by ASTM D570. More specifically, it is weight change rate before and after a substrate is immersed in water of 23 degrees Centigrade for 24 hours.

'Ten-point average roughness of the substrate surface (Rzjis)' is a value stipulated by Appendix JA of JIS B 0601:2013.

'Unit' of polymers may either be an atomic group directly formed from a monomer as a result of a polymerization reaction, or an atomic group resulting from processing, using a predetermined method, a polymer obtained through a polymerization reaction so as to convert a part of the structure. A unit based on a monomer A included in the polymers is simply written as 'monomer A unit'.

'(Meth)acrylate' is a general term for acrylate and methacrylate.

A long film (also referred to as 'main film 1') that is a first embodiment of the present invention is configured by thermomeltable F polymers including first units based on TFE and second units based on perfluoro (alkyl vinyl ether) (PAVE). The main film 1 includes spherulites of the F polymers, where the radii of the spherulites (may be referred to as 'spherulite radii' hereafter) are 10 μm or less.

The main film 1 including small sized spherulites in this manner is considered to have sufficiently small sized steps (unevenness) at the borders between crystal parts (spherulite portions) and amorphous parts of the film surface; in other words, the smoothness of the surface is sufficient. Therefore, a multilayer body (temporary multilayer body) resulting from laminating a long substrate on the main film 1 is considered to have high adherence between the main film 1 and the long substrate, and micro voids therebetween are thus not generated easily.

That is, with the temporary multilayer body, it is considered that either voids are not formed between the main film 1 and the long substrate, or even if voids are formed, they are sufficiently small.

Accordingly, even with a multilayer body (main multilayer body) obtained by laminating a second long substrate on the temporary multilayer body while heating, it is considered that partial detachment and generation of voids between the main film 1 and the long substrate are controlled.

For example, a main multilayer body using a long metal foil on at least either the long substrate or the second long substrate (may be referred generally as 'long substrates' hereafter) may be suitably used as a printed wiring board when it is cut to a predetermined length and the metal foil is processed into a transmission circuit. Even if the printed wiring board is subjected to a solder heat resistance test, detachment that progresses from the partial detachment and voids described above is easily prevented. That is, if the main film 1 is used, a printed wiring board (or the main multilayer body) with excellent solder heat resistance is easily obtained.

The F polymers of the main film 1 include at least one type of thermomeltable F polymer.

The spherulite radii of the F polymers included in the main film 1 are 10 µm or less, preferably 7.5 µm or less, more preferably 5 µm or less. In this case, adherence between the main film 1 and the long substrates is heightened even more easily. The spherulite radii are preferably 0.2 µm or greater, more preferably 0.5 µm or greater.

The MFR of the F polymers of the main film 1 is preferably within a range of 5 to 40 g/10 min, more preferably 10 to 30 g/10 min, even more preferably 15 to 30 g/10 min. In this case, the spherulite radii of the F polymers are easily controlled.

The melting temperature of the F polymers of the main film 1 is preferably within a range of 200 to 320° C. In this case, yield when producing the main film 1 is further improved.

The F polymers of the main film 1 are copolymers including the first units based on TFE and the second units based on PAVE. Of all the units constituting the F polymers, the ratio of the first unit and ratio of the second unit are preferably 80 to 99 mol % and 1 to 20 mol %, respectively. The F polymers may further include other units. Moreover, the F polymers may also include a polar functional group described later in the main chain terminal group.

PAVE may be perfluoro (methyl vinyl ether) ($CF_2$=$CFOCF_3$:PMVE), $CF_2$=$CFOCF_2CF_3$, perfluoro (propyl vinyl ether) ($CF_2$=$CFOCF_2CF_2CF_3$:PPVE), or $CF_2$=$CFOCF_2CF_2CF_3$.

The F polymers of the main film 1 are preferably: (i) F polymers including third units based on monomers having a polar functional group, (ii) F polymers including 2 to 4 mol % of PPVE units as the second units, or (iii) F polymers including PMVE units as the second units.

Since polar functional groups interact with one another during crystallization, the F polymers of (i) described above are thought to facilitate formation of a lamella structure, making it easy to converge the spherulite radii of the F polymers to within a desired range. Moreover, due to the polar functional groups, adherence between the main film 1 and the long substrates is heightened more easily.

The polar functional group is preferably a hydroxyl-containing group, a carbonyl group-containing group, an acetal group or a phosphono group (—OP(O)$OH_2$), more preferably the carbonyl group-containing group from the perspective of further heightening adherence to the long substrates.

The hydroxyl-containing group is preferably a group containing an alcoholic hydroxy group, more preferably either $CF_2CH_2OH$, —C($CF_3$)$_2$OH or a 1,2-glycol group (—CH(OH)$CH_2OH$).

The carbonyl group-containing group is a group including a carbonyl group (>C(O)), preferably a carboxyl group, an alkoxy carbonyl group, an amide group, an isocyanate group, a carbamate group (—OC(O)$NH_2$), an acid anhydride residual group (—C(O)OC(O)—), an imide residual group (—C(O)NHC(O)— etc.), or a carbonate group (—OC(O)O—).

Note that of all the units constituting the F polymers of (i) described above, the ratio of the first unit, ratio of the second unit, and ratio of the third unit are preferably 90 to 99 mol %, 0.5 to 9.97 mol %, and 0.01 to 3 mol %, respectively.

The monomer constituting the third unit may be itaconic anhydride, citraconic anhydride, 5-norbornene-2, 3-dicarboxylic acid anhydride (alternate name: nadic anhydride; also referred to as 'NAH' hereafter), or maleic anhydride.

Since the F polymers of (ii) described above contain a medium quantity (2 to 4 mol %) of the PPVE unit as the second unit, they are thought to facilitate formation of a lamella structure, making it easy to converge the spherulite radii of the main film 1 to within a desired range. The F polymers are constituted by the TFE unit and the PPVE unit, preferably containing 96 to 98 mol % of the TFE unit, and 2 to 4 mol % of the PPVE unit.

Since the F polymers of (iii) described above contain a short side chain PMVE unit as the second unit, they are thought to facilitate formation of a lamella structure during crystallization, making it easy to converge the spherulite radii of the main film 1 to within a desired range. These F polymers preferably contain 10 to 20 mol % of the PMVE unit. These F polymers are constituted by the TFE unit and the PMVE unit, preferably containing 80 to 90 mol % of the TFE unit and 10 to 20 mol % of the PMVE unit.

One type of the F polymers of the main film 1 may be used alone, or otherwise two or more types may be used. As an embodiment of the latter, an embodiment including first F polymers containing less than 2 mol % of the PPVE unit as the second unit, and second F polymers selected from a group made up of the F polymers of (iii) described above and the F polymers of (i) described above is possible.

In this embodiment, the second F polymers are considered to function as a crystal core, facilitating crystallization of the first F polymers around the crystal core. As a result, the spherulite radii of the main film 1 may be easily adjusted to be within a desired range.

The first F polymers are constituted by the TFE unit and the PPVE unit, preferably containing more than 98 mol % of the TFE unit and less than 2 mol % of the PPVE unit.

Mass ratio of the first F polymers to the second F polymers is preferably within a range of 2 to 50, more preferably 5 to 35. In this case, the spherulite radii of the F polymers are adjusted more easily.

With the main film 1, size of the spherulites (spherulite radius) of the F polymers is sufficiently small. As a result, the haze is reduced in the main film 1. More specifically, when the main film 1 having a thickness of 50 µm is produced, the haze thereof is preferably within a range of 1 to 5%, more preferably 1 to 3%. Note that if the second unit content of the F polymer is adjusted to be within the above range, size of the spherulites may be made sufficiently small, allowing control of the haze to be within the range of 1 to 5%. Moreover, in this case, excellent heat resistance may also be given to the main film 1.

The main film 1 may include a resin other than the F polymers within a range that does not damage the results of the present invention. However, the amount of the F polymers included in the main film 1 is preferably 90 mass % or greater, more preferably 100 mass %.

Resin other than the F polymers may be epoxy resin, polyimide resin, polyamic acid, which is a polyamide precursor, acrylic resin, phenol resin, liquid crystalline polyester, polyolefin resin, modified polyphenylene ether resin, polyfunctional cyanic ester resin, polyfunctional maleimide-cyanic ester resin, polyfunctional maleimide resin, vinyl ester resin, urea resin, diallyl phthalate resin, melanin resin, guanamine resin, melamine-urea polycondensation resin, styrene resin, polycarbonate resin, polyarylate resin, polysulfone, polyarylsulfone, aromatic polyamide resin, aromatic polyetherimide, polyphenylene sulfide, polyaryle ether ketone, polyamide imide, or polyphenylene ether.

Moreover, the main film 1 may include other components, such as a thixotropy imparting agent, an antifoaming agent, a silane coupling agent, a dehydrator, a plasticizer, a weathering agent, an antioxidant, a heat stabilizer, a lubricant, an antistatic agent, a brightening agent, a coloring agent, a conductive agent, a mold release agent, a surface treating agent, a viscosity modifier, or a flame retardant, within a range that does not damage the results of the present invention.

The main film 1 may be produced using a die coating method (melt extrusion method using a T-die) from the perspective of easy adjustment of the size of the F polymer spherulites.

The inventors have found that the degree of growth of the F polymer spherulites due to the die coating method depends on the state (temperature, fluidity) of the melted F polymers and cooling conditions, particularly that it is determined by the difference (cooling condition) between the temperature of the melted F polymers and temperature of cooling rollers. In other words, the inventors have found that if the die coating method is used and the state of the F polymers and the cooling conditions are set appropriately, growth of the F polymer spherulites is controlled, converging the spherulite radii to within a desired range.

The method of producing the main film 1 (may be referred to as 'main method 1' hereafter) is a method of producing the main film 1 using the die coating method, wherein the F polymers are discharged in a melted state from the die, and the melted F polymers are heated by non-contact heating parts before making contact with the first cooling roller.

FIG. 1 is a schematic diagram illustrating an embodiment of a long film production apparatus used in the main method 1.

A production apparatus 10 illustrated in FIG. 1 has a T-die 20, paired first cooling rollers 30 arranged facing each other vertically below the T-die 20, a second cooling roller 40 adjoined to the first cooling rollers 30, a winding roller 50 for winding the long film 1 (main film 1), and transport rollers 61 and 62 and nip rollers 70 arranged between the winding roller 50 and the second cooling roller 40. Moreover, the production apparatus 10 has paired heaters (non-contact heating parts) 80 arranged facing each other between the T-die 20 and the first cooling rollers 30.

The F polymers are melted by heating within an extruder (omitted from the drawing) that is connected to the T-die 20, and then supplied to the T-die 20. The melted F polymers are discharged from a lip 21 of the T-die 20 toward the first cooling rollers 30.

Next, the discharged melted F polymers are heated without touching the heaters 80 when passing through between the paired heaters 80, and then cooled when being held (nipped) and being passed through between the paired first cooling rollers 30. Moreover, once the F polymers make contact with the second cooling roller 40 and are cooled, they are transported by the transport rollers 61 and 62.

Subsequently, the F polymers are passed through between the nip rollers 70 and wound up as the long film 1 by the winding roller 50.

According to this configuration, the melted F polymers discharged from the T-die 20 are kept at a high temperature by heat from the heaters 80 even until reaching the first cooling rollers 30. Therefore, the melted F polymers flowing toward the first cooling rollers 30 maintain a relatively high fluidity, making it difficult to be stretched due to their own weight and tensile force of the first cooling rollers 30. As a result, it is concluded that the melted F polymers have spherulite growth controlled through rapid cooling by the first cooling rollers 30 during film formation, obtaining the long film 1 including spherulites having the size (radius) as described above.

Particularly, with the configuration illustrated in FIG. 1, since the F polymers discharged from the T-die 20 are heated by the heaters 80 from either side along the thickness thereof, results of high uniformity of temperature along the thickness and uniformity of the above spherulite growth are excellent. Moreover, from the perspective of making spherulite growth uniform, it is preferable to configure the heaters 80 such that the temperature along the width of the F polymers is also uniform. In this case, for example, width of the heaters 80 should be designed sufficiently larger than the length along the width of the F polymers.

Letting the temperature of the F polymers in the T-die 20 be $X[° C.]$ and the temperature of the heaters 80 be $Z[° C.]$, difference therebetween (absolute value: $|X-Z|$) is preferably 70° C. or less, more preferably within a range of 30 to 50° C. In this case, the temperature of the F polymers may be kept sufficiently high until reaching the first cooling rollers 30 while preventing deterioration of the F polymers.

Meanwhile, letting the temperature of the F polymers in the T-die 20 be $X[° C.]$ and the temperature of the first cooling rollers 30 be $Y[° C.]$, difference therebetween $(X-Y)$ is preferably 230° C. or greater, more preferably within a range of 250 to 300° C. In this case, the difference between the temperature of the melted F polymers and the temperature of the first cooling rollers 30 may be made sufficiently large. Therefore, the F polymers may be effectively rapidly cooled, thereby controlling spherulite growth so as to make the size thereof sufficiently small, and suitably prevent deformation of the long film 1 due to lack of cooling. More specifically, 'Y' is appropriately set in accordance with 'X', and is preferably within a range of 50 to 100° C.

Moreover, from the perspective of making spherulite growth uniform also when cooling using the first cooling rollers 30, it is preferable to configure the first cooling rollers 30 such that the temperature along the width of the F polymers may be made uniform.

Accordingly, the first cooling rollers 30 are preferably configured having a mechanism of passing a heat medium through, and preferably configured having a compound mechanism of moving back and forth along the width thereof so as to repeatedly pass a heat medium through. Furthermore, the first cooling rollers 30 are preferably configured by metal rollers with excellent heat conductivity. Note that temperature Y of the first cooling rollers 30 denotes temperature of the heat medium.

Thickness (thickness t in FIG. 1) of the melted F polymers before making contact with the first cooling rollers 30 is preferably within a range of 5 to 150 μm, more preferably 10 to 100 μm. In this case, precision of heating by the heaters 80 and cooling by the first cooling rollers 30 is improved, facilitating control of spherulite growth.

If ratio (draw ratio) of the opening of the lip 21 of the T-die 20 to thickness of the ultimately obtained long film 1 is large, the molecular chain of the F polymers is in a strongly stretched state, facilitating alignment of the polymer molecules. As a result, enlargement of the spherulites tends to progress easily. Accordingly, the draw ratio is preferably 50 or less.

Moreover, rotation speed (rotation speed S in FIG. 1) of the first cooling rollers 30 is preferably within a range of 2 to 25 m/min, more preferably 5 to 20 m/min, also from the perspective of controlling unnecessary growth of the spherulites.

Note that the temperature of the second cooling roller 40 is preferably within a range of 30 to 80° C.

Surface treatment that may introduce a polar functional group to the surface of the F polymers (main film 1) after detachment from the first cooling rollers 30 may be carried out.

The surface treatment may be an electric discharge treatment such as corona discharge treatment or plasma treatment, plasma-graft polymerization, electron beam irradiation, a light irradiation treatment such as excimer UV light irradiation, an Itro treatment using flames, or wet etching using metallic sodium.

A polar functional group, such as a hydroxy group, a carbonyl group, or a carboxy group, is introduced to the surface of the long film 1 through this surface treatment, thereby heightening adherence to other surfaces as a result.

Note that while the paired heaters 80 are arranged according to the configuration of FIG. 1, arrangement of only one heater is also possible. Moreover, the non-contact heaters may be configured with blow apparatus for blowing hot air in place of the heaters 80. Furthermore, the outer first cooling roller 30 of the two first cooling rollers 30 may be omitted.

A long multilayer body may be produced using the main film 1.

A method for producing a long multilayer body according to the present invention (also referred to as 'main method 2' hereafter) is a method providing a long multilayer body having a long film and a long substrate in this order by laminating the main film 1 and a long substrate at a temperature within a range of 25 to 100° C.

Figure 2:
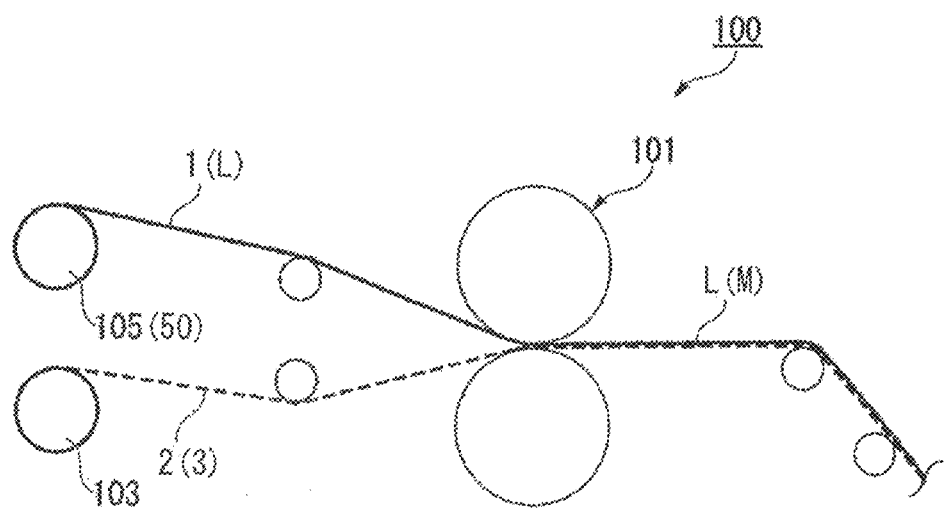
FIG. 2 is a schematic diagram illustrating an embodiment of a long multilayer body production apparatus used in main methods 2 and 4.

FIG. 2 is a schematic diagram illustrating an embodiment of the long multilayer body production apparatus used in the main method 2.

A production apparatus 100 illustrated in FIG. 2 has paired laminate rollers 101, and a first delivery roller 103 and a second delivery roller 105 (winding roller 50) arranged at a distance from each other at a previous stage to the laminate rollers 101. Moreover, the production apparatus 100 has a winding roller (omitted from the drawing) arranged at a subsequent stage to the laminate rollers 101.

The laminate rollers 101 include a heating mechanism, where the roller surface temperature may be adjusted to an arbitrary temperature. The roller including a heating mechanism may be an electric heating roller, a heat medium circulating roller, or an induction heating roller. From the perspective of uniform heating performance of the entire roller, the induction heating roller is preferred as the laminate roller 101.

A long substrate 2 is wound around the first delivery roller 103. The first delivery roller 103 may control unwinding speed of the long substrate 2, and control tension imparted to the long substrate 2 to be transported by the laminate rollers 101.

On the other hand, the long film 1 (main film 1) is wound around the second delivery roller 105. The second delivery roller 105 may control unwinding speed of the long film 1, and control tension imparted to the long film 1 to be transported by the laminate rollers 101.

With the production apparatus 100, the long substrate 2 continuously delivered from the first delivery roller 103 and the long film 1 continuously delivered from the second delivery roller 105 become laminated when passing through between the paired laminate rollers 101, which have a surface temperature of T1, and are pressurized along the thickness (laminating direction) at the temperature T1 when continuously passing through between the paired laminate rollers 101. As a result, a long multilayer body L is provided having the long film 1 and the long substrate 2 adhered to each other in this order.

The obtained long multilayer body L may either be continuously wound using a winding roller machine arranged at a subsequent stage, or may be provided as is to the next step.

The surface temperature (laminating temperature) of the laminate rollers 101, that is, the temperature T1 during lamination of the long film 1 and the long substrate 2 is within a range of 25 to 100° C., preferably 35 to 80° C., more preferably 45 to 60° C. In this case, a degree of adhesion such that the long film 1 and the long substrate 2 do not detach from each other when transporting the long multilayer body L is easily achieved, and deformation (particularly generation of wrinkles in the long film 1) of the long multilayer body L is controlled.

Note that the surface temperature of the laminate rollers 101 is measured using a contact-type thermocouple.

The pressure between the paired laminate rollers 101, that is, pressure applied during lamination of the long film 1 and the long substrate 2 is preferably within a range of 1 to 30 kN/m, more preferably 5 to 20 kN/m. In this case, a degree of adhesion such that the long film 1 and the long substrate 2 do not detach from each other when transporting the long multilayer body L is easily achieved, and deformation (particularly generation of oblique wrinkles in the long film 1) of the long multilayer body L is controlled.

Moreover, tensile force imparted respectively to the long film 1 and the long substrate 2 during transportation is preferably set such that deformation of the long multilayer body L does not occur. The tension is found using a tension pickup roller. Note that the tension imparted to the long film 1 and the long substrate 2 may be adjusted by the first delivery roller 103 and the second delivery roller 105.

The running speed (laminate speed) when the long film 1 and the long substrate 2 pass through between the paired laminate rollers 101 is preferably set to 0.5 to 5 m/min as long as it is a range allowing good lamination of the long film 1 and the long substrate 2.

Moreover, the angle made when the long film 1 and the long substrate 2 enter between the laminate rollers 101 is preferably within a range of 3 to 45 degrees. In this case, air between the long film 1 and the long substrate 2 may be favorably eliminated at the time of lamination, and deformation (particularly generation of wrinkles in the long film 1) of the long multilayer body L is controlled.

Furthermore, a second long substrate 3 may be laminated on the opposite side to the long substrate 2 of the long film 1. This provides a long multilayer body M having a 3-layer structure.

The long multilayer body M may also be produced using the production apparatus 100 illustrated in FIG. 2. Note that reference numerals within parentheses in FIG. 2 indicate respective members in this processing step. In this case, the first delivery roller 103 around which the second long substrate 3 is wound and the second delivery roller 105 around which the long multilayer body L is wound are set such that the long film 1 of the long multilayer body L faces the second long substrate 3 in the production apparatus 100.

The surface temperature (laminating temperature) of the laminate rollers 101, that is, temperature T2 during lamination of the long multilayer body L and the second long substrate 3 preferably exceeds 100° C., more preferably exceeds 125° C. In this case, the long multilayer body L and the second long substrate 3 are sufficiently adhered easily.

Note that other conditions for lamination of the long multilayer body L and the second long substrate 3 may be set in the same manner as setting of conditions for lamination of the long film 1 and the long substrate 2, including the favorable embodiments and ranges thereof.

The long substrate 2 and the second long substrate 3 preferably include at least one of a long heat resistant substrate and a long metal foil. The word 'long' may be omitted when describing the long heat resistant substrate and the long metal foil below.

The heat resistant substrate may be a heat resistant resin film, woven or nonwoven fabric made of inorganic fibers, or woven or nonwoven fabric made of organic fibers.

The heat resistant resin may be polyimide (aromatic polyimide etc.), polyarylate, polysulfone, polyarylsulfone (polyethersulfone etc.), aromatic polyamide, aromatic polyetheramide, polyphenylene sulfide, polyalyl ether ketone, polyamide imide, or liquid crystal polyester.

Aromatic polyimide films include single-layer structured films and multilayer structured films. A commercially available product of the former is Kapton EN (manufactured by DuPont-Toray Co., Ltd.), and commercially available products of the latter are UPILEX VT and UPILEX NVT (manufactured by Ube Industries, Ltd.), and PIXEO BP (manufactured by Kaneka Corporation).

The polyimide film preferably has a low water absorption rate. The polyimide configuring the polyimide film with a low water absorption rate is preferably a copolymer of paraphenylenediamine and 3,3',4,4'-Biphenyltetracarboxylic dianhydride. Moreover, the polyimide film with a low water absorption rate is preferably an aromatic polyimide film without a thermoplastic polyimide layer.

A commercially available product of the liquid crystal polyester is Vecstar-CT-Z (manufactured by Kuraray Co., Ltd.)

The water absorption rate of the heat resistant substrate is preferably 2% or less, more preferably 1.5% or less.

Note that the heat resistant substrate denotes a substrate having a tensile elasticity rate of $1 \times 10^8$ Pa at a minimum temperature of 260° C. in a solder reflow processing step.

Thickness of the heat resistant substrate is preferably within a range of 5 to 150 μm, more preferably 12 to 75 μm.

The metal foil is appropriately selected in accordance with applications of the long multilayer bodies L and M. For example, when using the long multilayer bodies L and M for electronic apparatus and electrical equipment, the metal configuring the metal foil may be copper, a copper alloy, stainless steel, nickel, a nickel alloy (including 42 Alloy), aluminum, or an aluminum alloy.

Of these, the metal foil is preferably copper foil, more preferably rolled copper foil or electrolytic copper foil, even more preferably rolled copper foil that is the same front and back.

The front surface of the metal foil may be provided with a rust-proof layer (oxide film such as chromate etc.), a heat resistant layer, a roughening-treated layer, or a layer treated with a silane coupling agent.

Thickness of the metal foil is preferably within a range of 2 to 40 μm, more preferably 2 to 15 μm.

Moreover, a metal foil with a carrier including two or more layers of metal foil may be used as the metal foil. The metal foil with the carrier may be constituted by a carrier copper foil (10 to 35 μm in thickness) and a very thin copper foil (2 to 5 μm in thickness) laminated on the carrier copper foil via a release layer. A long multilayer body having the very thin copper foil may be easily produced as long as only the carrier copper foil of the metal foil with the carrier is released. If the long multilayer body is used, a fine pattern may be formed through a modified semi-additive process (MSAP) using the very thin copper foil layer as a plating seed layer.

A specific example of the metal foil with a carrier is 'FUTF-5DAF-2' manufactured by Fukuda Metal Foil & Powder Co., Ltd.

Ten-point average roughness of the metal foil surface (Rzjis) is preferably 2 μm or less, more preferably 1 μm or less, even more preferably under 0.1 μm. The ten-point average roughness of the metal foil surface is preferably 0.01 μm or greater.

Since a long film including small spherulites (that is, a long film with high surface smoothness) is used even in an embodiment where a very thin metal foil or a very smooth metal foil with little surface roughness is used, the long multilayer bodies L and M equipped with sufficient adherence are easily obtained. Moreover, since the voids between the long film 1 and the metal foil become even smaller in this case, the printed wiring board obtained by processing the long multilayer bodies L and M has excellent electrical properties.

Note that when the long substrate 2 and the second long substrate 3 are laminated substrates of a heat resistant substrate and a metal foil, the heat resistant substrate and the metal foil may be directly laminated, or may be laminated via an adhesive layer. Constituent materials (adhesives) for the adhesive layer may be thermoplastic polyimide and epoxy resin.

Figure 3:
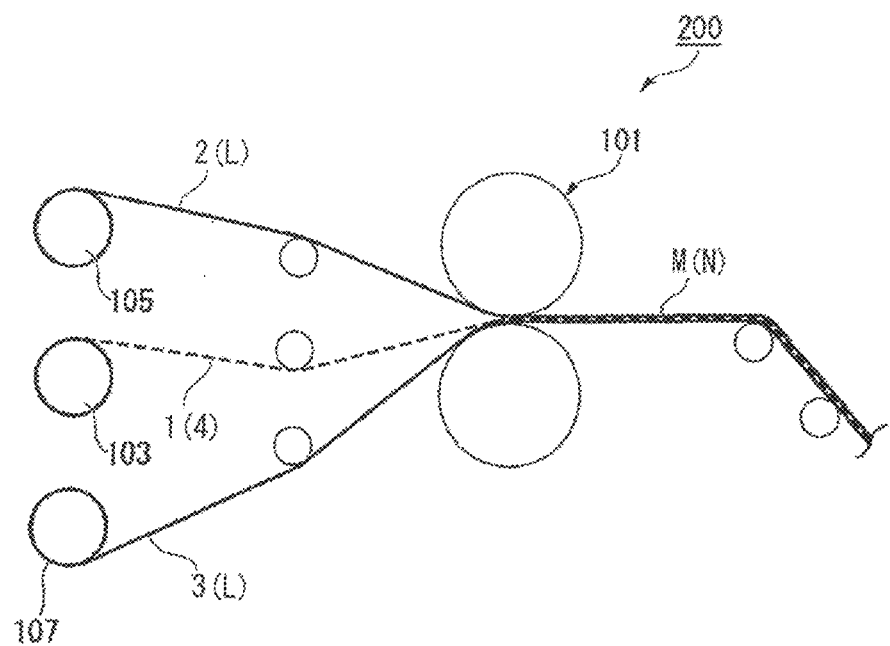
FIG. 3 is a schematic diagram illustrating another embodiment of the long multilayer body production apparatus used in the main methods 2 and 4.

The long multilayer body M may be produced not only in two steps as described above, but also in one step using a production apparatus illustrated in FIG. 3.

FIG. 3 is a schematic diagram illustrating another embodiment of the long multilayer body production apparatus used in the main method 2. Note that in FIG. 3, components corresponding to those in FIG. 2 are given the same reference numerals, and detailed description thereof is omitted.

A production apparatus 200 illustrated in FIG. 3 has the paired laminate rollers 101, and the first delivery roller 103, the second delivery roller 105, and a third delivery roller 107 arranged at a distance from each other at a previous stage to the laminate rollers 101. Moreover, the production apparatus 200 has a winding roller (omitted from the drawing) arranged at a subsequent stage to the laminate rollers 101.

That is, the production apparatus 200 illustrated in FIG. 3 is the same as the production apparatus 100 illustrated in FIG. 2 aside from further having the third delivery roller 107.

With the production apparatus 200 illustrated in FIG. 3, the long film 1 (main film 1) is wound around the first delivery roller 103. The first delivery roller 103 may control unwinding speed of the long film 1, and control tension imparted to the long film 1 to be transported by the laminate rollers 101.

The long substrate 2 is wound around the second delivery roller 105. The second delivery roller 105 may control unwinding speed of the long substrate 2, and control tension imparted to the long substrate 2 to be transported by the laminate rollers 101.

Moreover, the second long substrate 3 is wound around the third delivery roller 107. The third delivery roller 107 may control unwinding speed of the second long substrate 3, and control tension imparted to the second long substrate 3 to be transported by the laminate rollers 101.

With the production apparatus 200, the long film 1 continuously delivered from the first delivery roller 103, the long substrate 2 continuously delivered from the second delivery roller 105, and the second long substrate 3 continuously delivered from the third delivery roller 107 become laminated when passing through between the paired laminate rollers 101, which have a surface temperature of T1, and are pressurized along the thickness (laminating direction) at the temperature T1 when continuously passing through between the paired laminate rollers 101. As a result, a long multilayer body M is provided having the long substrate 2, the long film 1, and the second long substrate 3 adhered to each other in this order.

The obtained long multilayer body M may either be continuously wound using a winding roller machine arranged at a subsequent stage, or may be provided as is to the next step.

Conditions for lamination of the long substrate 2, the long film 1, and the second long substrate 3 may be set in the same manner as setting of the conditions for lamination of the long film 1 and the long substrate 2 described with FIG. 2, including the favorable embodiments and ranges thereof.

Use of the production apparatus 100 and 200 described above allows production of a long multilayer body having various layered structures.

The various layered structures may include metal foil/long film, heat resistant resin film/long film, metal foil/long film/metal foil, heat resistant resin film/long film/heat resistant resin film, long film/metal foil/long film, long film/heat resistant resin film/long film, or metal foil/long film/heat resistant resin film/long film/metal foil. Note that 'metal foil/long film' indicates that the metal foil and the long film are laminated in this order, and the same holds for the other layered structures.

A long multilayer body N having the last given layered structure (that is, a long multilayer body having a 5-layer structure) may be produced by using and arranging, in the production apparatus 200 illustrated in FIG. 3, the first delivery roller 103 and the third delivery roller 107 around which is wound the long multilayer body L made from the metal foil and the long film 1, and the second delivery roller 105 around which the heat resistant resin film 4 is wound such that the long film 1 of the long multilayer body L is facing the heat resistant resin film 4. Note that reference numerals within parentheses in FIG. 3 indicate respective members in this processing step.

The surface temperature (laminating temperature) of the laminate rollers 101, that is, temperature T3 during lamination of the long multilayer body L and the heat resistant resin film 4 is preferably within a range of 250 to 450° C., more preferably 300 to 400° C. When the temperature T3 falls within the above range, the long multilayer body L and the heat resistant resin film 4 may be firmly adhered together.

Note that other conditions for lamination of the two long multilayer bodies L and the heat resistant resin film 4 may be set in the same manner as setting of conditions for lamination of the long film 1 and the long substrate 2, including the favorable embodiments and ranges thereof.

In addition, the long multilayer body N having the last given layered structure may be produced by using and arranging, in the production apparatus 200 illustrated in FIG. 3, the first delivery roller 103 and the third delivery roller 107 around which the metal foil is wound, and the second delivery roller 105 around which is wound the long multilayer body M made from the long film 1 laminated on either side of the heat resistant resin film.

Conditions for lamination in this case may also be set in the same manner as setting of the conditions for lamination of the long multilayer body L and the heat resistant resin film 4 described above.

Since the long multilayer body comprised of the main film 1 includes a long film configured by F polymers, it has excellent physical properties such as heat resistance and electrical properties, and is useful as electric circuit board material for a printed wiring board (particularly a flexible printed wiring board) or the like.

For example, a printed wiring board may be produced from a long multilayer body using a method of cutting the long multilayer body to a predetermined length and etching the metal foil into a transmission circuit with a predetermined pattern. Since the printed wiring board has the transmission circuit and an F polymer layer in this order, and the F polymer layer is made of a long film including small spherulites, solder heat resistance is excellent, and detachment of the transmission circuit and the F polymer layer does not occur easily.

Moreover, a long multilayer body may also be produced by forming a metal layer on the surface of the main film 1 using at least either a vapor phase growth method or a plating method. More specifically, if a metal seed layer is formed on the surface of the main film 1 using the vapor phase growth method, and a metal layer is formed using the plating method, a long multilayer body having a conductive metal layer including the metal seed layer and the metal layer may be produced.

The vapor phase growth method may be either physical vapor deposition or chemical vapor deposition.

The metal configuring the metal layer may be copper, a copper alloy, stainless steel, nickel, a nickel alloy (including 42 Alloy), titanium, a titanium alloy, aluminum, or an aluminum alloy.

Thickness of the metal layer is preferably within a range of 1 to 20 µm, more preferably 3 to 15 µm. If the metal layer has this thickness, generation of distortions of the multilayer body as a whole is easily controlled, and is appropriate for use in various applications.

Moreover, according to the vapor phase growth method, a uniform metal layer having excellent adherence to the main film 1 is easily formed. The vapor phase growth method may be a sputtering method, a vacuum deposition method, an ion plating method, or a pulsed laser deposition method, preferably the sputtering method. Use of the sputtering method allows formation of a metal layer having higher adherence to the main film 1.

More specifically, the metal layer is preferably formed by forming a metal seed layer of the nm order using the sputtering method, and growing it until the µm order using an electrolytic plating method. The crystalline structure of the metal in the metal seed layer preferably forms a columnar structure.

The long multilayer body after the conductive metal layer is formed may be further heated and refired. Particularly, when the long multilayer body after the conductive metal layer is formed is refired in a nitrogen gas atmosphere, peeling resistance between the main film 1 and the conductive metal layer is more easily improved due to softening of the main film 1 during heating. In this case, peeling resistance between the main film 1 and the conductive metal layer is more easily improved by controlling fluidity of the main film 1 and spreading the surface molecules of the conductive metal layer on the main film 1. Moreover, stress of the entire long multilayer body is alleviated by refiring, and improvement of dimensional stability thereof is more easily improved.

Furthermore, before producing the long multilayer body, the main film 1 may be heat treated so as to reduce molding distortion thereof.

The main film 1 is preferably heated at 150° C. for 30 minutes with the dimensions at 25° C. as a standard, so that the absolute value of respective dimensional change rates in MD (flow direction) and TD (width direction) when cooling until 25° C. thereafter is less than 1.0%.

Molding distortion due to a production method thereof (melt molding method using extrusion molding) remains in the normal form of the thermomeltable fluororesin film (roll film etc.). Therefore, the dimensional change rates thereof exceed 1.0%. If film thickness, heat treatment conditions, and winding conditions of the film are adjusted, the respective dimensional change rates may converge to within a predetermined range. Accordingly, dimensional stability after a circuit is formed by processing the long multilayer body with the conductive metal layer formed may be improved.

The long multilayer body according to the present invention has the main film 1 and the conductive metal layer in this order. The conductive metal layer preferably includes a metal seed layer and a metal layer, more preferably, it is formed from only a metal seed layer and a metal layer.

Since the long multilayer body also includes the main film 1 configured by F polymers, and has excellent physical properties such as heat resistance and electrical properties, it is useful as electric circuit material for a printed wiring board (particularly a flexible printed wiring board) etc.

Since the printed wiring board produced from the long multilayer body includes the transmission circuit, which is formed from the conductive metal layer, and the F polymer layer in this order, and the F polymer layer is formed from the main film 1 including small spherulites, solder heat resistance is excellent, and detachment of the transmission circuit and the F polymer layer does not occur easily.

A long film (may be described as 'main film 2' hereafter), which is a second embodiment of the present invention, is configured by polymers (may be described as 'F polymers II' hereafter) including TFE units and has an MFR of 5 to 40 g/10 min. When the main film 2 is heated at 180° C. for 30 minutes so as to measure the thermal expansion rate, and when A[%] denotes the thermal expansion rate in a first direction, which stretches at a 45-degree angle to a flow direction (MD direction) thereof, and B[%] denotes thermal expansion rate in a second direction orthogonal to the first direction, A and B are respectively within the range of −2 to +1%, and |A−B| is 1% or less.

If the long multilayer body, which results from laminating the main film 2 and the long metal foil as a long substrate, is cut to a predetermined length and the metal foil is processed into a transmission circuit (including via holes), it may be suitably used as a printed wiring board.

The main film 2 with the thermal expansion rates A and B in two oblique directions (oblique to the flow direction) and the difference therebetween (absolute value: |A−B|) falling within the above respective ranges has small oblique distortions and is thus sufficiently uniform. Accordingly, oblique wrinkles are not easily generated in the main film 2 when producing the long multilayer body, thereby maintaining a high yield.

Moreover, it is thought that even the long multilayer body has small oblique distortions and is thus sufficiently uniform. Therefore, the long multilayer body has excellent thermal shock resistance and is thought to have controlled oblique deformation during processing thereof. For example, when the long multilayer body according to the present invention that uses metal foil as the long substrate is processed into a printed wiring board, thermal shock resistance when forming through-holes or via-holes is high, thereby making it difficult for disconnection to occur and easy to provide a printed wiring board.

Note that the thermal expansion rates A and B in the respective oblique directions of the main film 2 are measured in the following manner. First, a square sample with one side 12 cm in length having two sides along the flow direction (longitudinal direction, MD direction) and two sides along a width direction (transverse direction, TD direction) is cut out from the main film 2. 10 cm-long lines are then drawn along diagonal lines on the surface of the obtained sample. Next, the sample is placed and heated in a 180° C. oven for 30 minutes, and then taken out so as to measure lengths of the lines drawn along the diagonal lines again.

The thermal expansion rates A and B are values measured according to the formula: {(length of line before heating)−(length of line after heating)}/(length of line before heating)×100. That is, the thermal expansion rates A and B are rates of change (percentage) in length of the respective lines before and after heating. Note that 'minus' represents shrinkage of the main film 2, and 'plus' represents expansion of the main film 2.

The thermal expansion rates A and B are preferably within a range of −2.0 to +0.5%, more preferably −1.5% or greater and less than 0%. Moreover, the difference therebetween (|A−B|) is preferably 0.8% or less, more preferably 0.5% or less. If the thermal expansion rates A and B and the difference therebetween are within the above range respectively, even if they are heated, wrinkles due to nonuniform oblique distortions of the main film 2 do not occur easily.

The F polymers II of the main film 2 are thermomeltable tetrafluoroethylene polymers having a predetermined MFR.

The MFR of the F polymers II is within a range of 5 to 40 g/10 min, preferably 10 to 30 g/10 min, more preferably 15 to 30 g/10 min. In this case, oblique distortions of the produced main film 2 do not remain easily, sufficiently increasing thermal shock resistance.

The melting temperature of the F polymers II is preferably within a range of 200 to 320° C. In this case, the MFR thereof is easily adjusted to be within a desired range.

The F polymers II are polymers including the TFE units, and may be TFE homopolymers, or copolymers of comonomers of TFE and other units. Moreover, one type of the F polymers II alone may be used, or otherwise two or more types may be used.

The F polymers II of the main film 2 are preferably polymers including TFE units, units based on hexafluoropropylene (HFP) (HFP units), units based on perfluoro (alkyl vinyl ether) (PAVE) (PAVE units), or units based on fluoroalkylethylene (FAE) (FAE units) (may be described generally as TAE units' hereafter). The F polymers II are more preferably polymers resulting from introducing a polar functional group to the polymers given above.

The polar functional group is preferably a hydroxyl-containing group, a carbonyl group-containing group, an acetal group or a phosphono group (—OP(O)OH$_2$), more preferably the carbonyl group-containing group.

The hydroxyl-containing group is preferably a group containing an alcoholic hydroxy group, more preferably either —CF$_2$CH$_2$OH, —C(CF$_3$)$_2$OH or a 1,2-glycol group (—CH(OH)CH$_2$OH).

The carbonyl group-containing group is a group including a carbonyl group (>C(O)), preferably a carboxyl group, an alkoxy carbonyl group, an amide group, an isocyanate group, a carbamate group (—OC(O)NH$_2$), an acid anhydride residual group (—C(O)OC(O)—), an imide residual group (—C(O)NHC(O)— etc.), or a carbonate group (—OC(O)O—).

The F polymers II are preferably polymers including a hydroxyl-containing group or a carbonyl group from the perspective of heightening adherence to a substrate such as metal foil.

The method of introducing a polar functional group to the F polymers II may be a method of copolymerizing monomers including TFE and a polar functional group (may be described as 'polar monomers' hereafter), or method of conducting plasma treatment or corona discharge treatment on the F polymers II.

The F polymers II including a polar functional group may be polymers including units based on the polar monomers (may be described as 'polar units' hereafter) and TFE units, or polymers in which either a carbonyl group or a hydroxyl-containing group is introduced through plasma treatment or corona discharge treatment, or introduced as a result of an action of a polymerization initiator or a chain-transfer agent.

The F polymers II including a polar functional group are preferably polymers including TFE units and polar units, more preferably polymers including TFE units, PAE units, and polar units.

Of all the units constituting the F polymers II, the ratio of TFE units, ratio of PAE units, and ratio of polar units are preferably 90 to 99 mol %, 1 to 10 mol %, and 0 to 3 mol %, respectively.

The PAE units are preferably either PAVE units or HFP units, more preferably PAVE units. The PAE units may be two or more types of units.

PAVE may be $CF_2=CFOCF_3$ (PMVE), $CF_2=CFOCF_2CF_3$, $CF_2=CFOCF_2CF_2CF_3$ (PPVE), $CF_2=CFOCF_2CF_2CF_2CF_3$, or $CF_2=CFO(CF_2)_8F$, wherein either PMVE or PPVE is favorable.

FAE may be $CH_2=CH(CF_2)_2F$ (PFEE), $CH_2=CH(CF_2)_3F$, $CH_2=CH(CF_2)_4F$ (PFBE), $CH_2=CF(CF_2)_3H$, or $CH_2=CF(CF_2)_4H$.

The polar monomers may be itaconic anhydride, citraconic anhydride, 5-norbornene-2, 3-dicarboxylic acid anhydride (alternate name: nadic anhydride; also referred to as 'NAH' hereafter), or maleic anhydride.

The main film 2 may include a resin other than the F polymers II within a range that does not damage the results of the present invention.

However, the amount of the F polymers II included in the main film 2 is preferably 90 mass % or greater, more preferably 100 mass %.

Embodiments of resin other than the F polymers and other components are the same as those embodiments except for the F polymers in the main film 1.

The main film 2 may be produced using the die coating method (melt extrusion method using a T-die) from the perspective of being able to adjust distortions (particularly oblique distortions) thereof.

The inventors have found that the oblique distortions of the long film due to the die coating method depend on the state (temperature, fluidity) of the melted F polymers II and cooling conditions, and are determined according to the state until the melted F polymers II discharged from the T-die are crystallized by the cooling rollers. In other words, the inventors have found that if the die coating method is used, the state of the F polymers II and the cooling conditions are set appropriately, and crystallization of the F polymers II is controlled, oblique distortions (thermal expansion rates A and B and difference therebetween) of the obtained main film 2 converge to within a predetermined range.

A method of producing the long film (may be referred to as 'main method 3' hereafter) of the present invention is a method of producing the main film 2 using the die coating method, wherein the F polymers II are discharged in a melted state from the die, and the melted F polymers II are heated by non-contact heating parts before making contact with the first cooling roller.

FIG. 1 is a schematic diagram illustrating an embodiment of a long film production apparatus used in the main method 3. Names and functions of respective parts in FIG. 1 are as given in the description of the main method 1.

According to this configuration, the melted F polymers II discharged from the T-die 20 are kept at a high temperature by heat from the heaters 80 even until reaching the first cooling rollers 30. Therefore, the melted F polymers II flowing toward the first cooling rollers 30 maintain a relatively high fluidity, making it difficult to be stretched due to their own weight and tensile force of the first cooling rollers 30. As a result, the melted F polymers II are observed to have controlled generation of a bowing phenomenon (oriented in an oblique direction of the F polymers II) when film making, and to have obtained a long film having small oblique distortions (thermal expansion rates A and B and difference therebetween) as described above.

Particularly, with the configuration illustrated in FIG. 1, since the F polymers II discharged from the T-die 20 are heated by the heaters 80 from either side along the thickness thereof, the results of high uniformity of temperature along the thickness and control of generation of the above bowing phenomenon are excellent. Moreover, from the perspective of further improving the result of controlling generation of the bowing phenomenon, it is preferable to configure the heaters 80 such that the temperature along the width of the F polymers II is also uniform. In this case, the width of the heaters 80 should be designed sufficiently larger than the length along the width of the F polymers.

Letting the temperature of the F polymers II in the T-die 20 be $X[°C.]$ and the temperature of the heaters 80 be $Z[°C.]$, difference therebetween (absolute value: $|X-Z|$) is preferably 70° C. or less, more preferably within a range of 30 to 50° C. In this case, the temperature of the F polymers II may be kept sufficiently high until reaching the first cooling rollers 30 while preventing deterioration of the F polymers.

Meanwhile, letting the temperature of the F polymers II in the T-die 20 be $X[°C.]$ and the temperature of the first cooling rollers 30 be $Y[°C.]$, difference therebetween (X−Y) is preferably 250° C. or less, more preferably 200° C. or less, even more preferably within a range of 125 to 175° C. In this case, since the extent of cooling the F polymers II using the first cooling rollers 30 is moderate, oblique distortions of the obtained long film 1 (main film 2) do not remain easily, and deformation due to insufficient cooling may be sufficiently prevented. More specifically, 'Y' is appropriately set in accordance with 'X', and is preferably within a range of 150 to 250° C.

Moreover, from the perspective of further improving the result of controlling generation of the bowing phenomenon also when cooling using the first cooling rollers 30, it is preferable to configure the first cooling rollers 30 such that the temperature along the width of the F polymers can be made uniform.

Accordingly, the first cooling rollers 30 are preferably configured having a mechanism of passing a heat medium through, and preferably configured having a compound mechanism of moving back and forth along the width thereof so as to repeatedly pass a heat medium through. Note that temperature Y of the first cooling rollers 30 denotes temperature of the heat medium.

Thickness (thickness t in FIG. 1) of the melted F polymers II before making contact with the first cooling rollers 30 is preferably within a range of 5 to 150 μm, more preferably 10 to 100 μm. In this case, precision of heating by the heaters 80 and cooling by the first cooling rollers 30 is improved, and oblique distortions of the obtained long film 1 do not remain easily.

If ratio (draw ratio) of opening of the lip 21 of the T-die 20 to the thickness of the ultimately obtained long film 1 is large, the molecular chain of the polymers included in the F polymers II is in a strongly stretched state, facilitating alignment of the polymer molecules. As a result, oblique distortions remaining in the long film 1 tend to become larger. Accordingly, the draw ratio is preferably 50 or less.

Moreover, rotation speed (rotation speed S in FIG. 1) of the first cooling rollers 30 is preferably within a range of 1 to 25 m/min, more preferably 2 to 20 m/min, also from the perspective of reducing oblique distortions remaining in the long film 1.

Note that the temperature of the second cooling roller 40 is preferably within a range of 50 to 100° C., more preferably 30 to 80° C.

Surface treatment that may introduce an adhesive functional group to the surface of the F polymers II (main film 2) after detachment from the first cooling rollers 30 may be carried out.

The surface treatment may be an electric discharge treatment such as corona discharge treatment or plasma treatment, plasma-graft polymerization, electron beam irradiation, a light irradiation treatment such as or excimer UV light irradiation, an Itro treatment using flames, or wet etching using metallic sodium.

A polar functional group such as a hydroxy group, a carbonyl group, or a carboxy group is introduced to the surface of the long film 1 through this surface treatment, thereby further heightening adherence to other surfaces.

Note that while the paired heaters 80 are arranged according to the configuration of FIG. 1, arrangement of only one is possible. Moreover, the non-contact heaters may be configured with blow apparatus for blowing hot air instead of the heaters 80. Furthermore, two of the first cooling rollers 30 may be arranged facing each other so as to pass the melted F polymers II through therebetween and cool them, or otherwise cooling may be carried out without the outer first cooling roller 30 of the two first cooling rollers 30.

A long multilayer body may be produced using the main film 2.

A method for producing a long multilayer body according to the present invention (also referred to as 'main method 4' hereafter) is a method providing a long multilayer body having the main film 2 and a long substrate in this order by laminating the main film 2 and the long substrate at a temperature within a range of 25 to 100° C.

Definitions and ranges of the long multilayer body and the method of producing the long multilayer body using the main film 2 are the same as those using the main film 1 in the main method 2, including the favorable embodiments and applications thereof.

A long film, a method for producing the long film, a method for producing a long multilayer body, and the long multilayer body have been described above; however, the present invention is no limited to the configurations of the embodiment described above.

For example, the long film and the long multilayer body according to the present invention, which have the configurations of the embodiment described above, may have another arbitrary configuration respectively added thereto, or otherwise they may be replaced with an arbitrary configuration that fulfills the same functions.

Moreover, the method for producing the long film and the method for producing the long multilayer body according to the present invention described above may have other arbitrary steps respectively added thereto, or otherwise they may be replaced with arbitrary steps that give the same results.

WORKING EXAMPLES

The present invention is described in detail using working examples below; however, the present invention is not limited thereto.

1. Production Example and Evaluation Example
(First)

1-1. F polymers
F polymers 1A: Polymers (melting point: 305° C.) including 98.0 mol % of TFE units and 2.0 mol % of PPVE units in this order but not having a polar functional group
F polymers 1B: Polymers (melting point: 300° C., MFR: 20 g/10 min) including 98.0 mol % of TFE units, 1.9 mol % of PPVE units, and 0.1 mol % of NAH units in this order, and having a polar functional group
F polymers 1C: Polymers (melting point: 305° C.) including 98.7 mol % of TFE units and 1.3 mol % of PPVE units in this order but not having a polar functional group F polymers 1D: Polymers (melting point: 285° C.) including 85.0 mol % of TFE units and 15.0 mol % of PMVE units in this order but not having a polar functional group
1-2. Long Film
1-2-1. Production of Long Film
(Long Film 11)

The F polymers 1A are put in an extruder (at 350° C.) connected to a T-die of the production apparatus illustrated in FIG. 1, and extruded (discharged) from the T-die with a width of 800 mm. Note that the temperature of the F polymers 1A within the T-die is set to 350° C. Moreover, the opening of the lip of the T-die is set to 0.75 mm.

Two ceramic heaters are installed vertically below the T-die, and temperature thereof is set to 400° C.

Heat medium circulating metal rollers are used as paired first cooling rollers, and temperature of the heat medium is set to 80° C. Moreover, rotation speed of the first cooling rollers is set to 15 m/min.

A surface of the F polymers after detachment from the first cooling rollers is subjected to corona discharge treatment at a discharge amount of 30 W·min/m$^2$, thereby obtaining a long film 11 with a thickness of 25 μm (draw ratio: 30) and a width of 500 mm.
(Long Film 12)

Aside from using the F polymers 1B in place of the F polymers 1A, a long film 12 is obtained in the same manner as the long film 11.
(Long Film 13)

Aside from using a mixture of 80 parts mass of the F polymers 1C and 20 parts mass of the F polymers 1D in place of the F polymers 1A, a long film 13 is obtained in the same manner as the long film 11.

(Long Film 14 (Comparative Example))

Aside from omitting the ceramic heaters, a long film 14 is obtained in the same manner as the long film 11.

1-2-2. Measurement of Spherulite Radius

For each long film, correlation between scattering vector $q(\mu m^{-1})$ and scattering intensity (Is) is found using a polymer phase structure analyzer ('PP-1000' manufactured by Otsuka Electronics Co., Ltd.) using small angle light scattering, so as to measure the spherulite radius thereof.

Letting the scattering vector at the greatest scattering intensity be qmax, which is represented by the equation: $qmax=(4\pi n/\lambda_0)\times\sin(\theta max/2)$ [where $\lambda_0$ denotes wavelength of light in a vacuum, n denotes refractive index of a medium, and $\theta max$ denotes scattering angle at peak position of scattering intensity], spherulite radius R $(\mu m)=4.09/qmax$ is found.

1-2-3. Measurement of Haze

Haze (degree of cloudiness) of each long film is measured in conformity with JIS K 7361-1:1997 using a haze meter ('HZ-2' manufactured by Suga Test Instruments Co., Ltd.). Note that the light source is a C light source.

1-3. Production of Temporary Long Multilayer Body

The long film 11 is laminated on either side of a 50 μm-thick polyimide film ('Kapton 200EN' manufactured by DuPont-Toray Co., Ltd.), which is a heat resistant resin film, under the following conditions using the production apparatus illustrated in FIG. 3, producing the temporary long multilayer body 11 having a three-layer structure.

The surface temperature (laminate temperature) of paired laminate rollers (metal rollers) is set to 60° C. Moreover, pressure applied by the laminate rollers is set to 15 kN/m, and transport speed (laminate speed) of the polyimide film and the long film 11 is set to 3 m/min.

Note that tension imparted to the polyimide film is set to 200N, and tension imparted to the long film 11 is set to 20N.

Aside from using the long films 12 to 14 in place of the long film 11, respective temporary long multilayer bodies 12 to 14 are obtained in the same manner as the temporary long multilayer body 11.

1-4-1. Production of Main Long Multilayer Body

Two long copper foils ('CF-T49A-DS-HD2-12' manufactured by Fukuda Metal Foil & Powder Co., Ltd., thickness: 12 μm, Rzjis: 1.2 μm) are laminated under the following conditions using the production apparatus illustrated in FIG. 3 such that the long film 11 of the temporary long multilayer body 11 does not make contact with the copper foil, thereby obtaining a main long multilayer body 11.

The surface temperature (laminate temperature) of paired laminate rollers (metal rollers) is set to 360° C. Moreover, pressure applied by the laminate rollers is set to 5 kN/m, and transport speed (laminate speed) of the copper foil and the temporary long multilayer body is set to 1 m/min.

Aside from using the temporary long multilayer bodies 12 to 14 in place of the temporary long multilayer body 11, respective main long multilayer bodies 12 to 14 are obtained in the same manner as the main long multilayer body 11.

1-4-2. Evaluation of Solder Heat Resistance

A 5 cm angle sample is cut out from each of the main long multilayer bodies, and an operation of floating the samples in a solder tank of 288° C. for ten seconds is carried out five times. Thereafter, the outer appearance of the samples is visually confirmed and evaluated in accordance with the following evaluation criteria.

[Evaluation Criteria]
- ○ (Possible): Expansion and detachment are not visually confirmed with the sample.
- × (Impossible): Expansion and detachment are visually confirmed with the sample.

The obtained results are collected in the following Table 1.

TABLE 1

| | Long film or long multilayer body number | | | |
|---|---|---|---|---|
| | 11 | 12 | 13 | 14 |
| Type of F polymers | 1A | 1B | 1C&1D | 1A |
| Provision of ceramic heaters | Yes | Yes | Yes | No |
| Draw ratio | 30 | 30 | 30 | 30 |
| First cooling roller temperature [° C.] | 80 | 80 | 80 | 80 |
| Spherulite radius [μm] | 5 | 0.5 | 7 | 17 |
| Haze [%] | 4 | 1 | 5 | 10 |
| Solder heat resistance | ○ | ○ | ○ | × |

Note that 1C and 1D represent a mixture of 80 parts mass of the F polymers 1C and 20 parts mass of the F polymers 1D.

Figure 4:
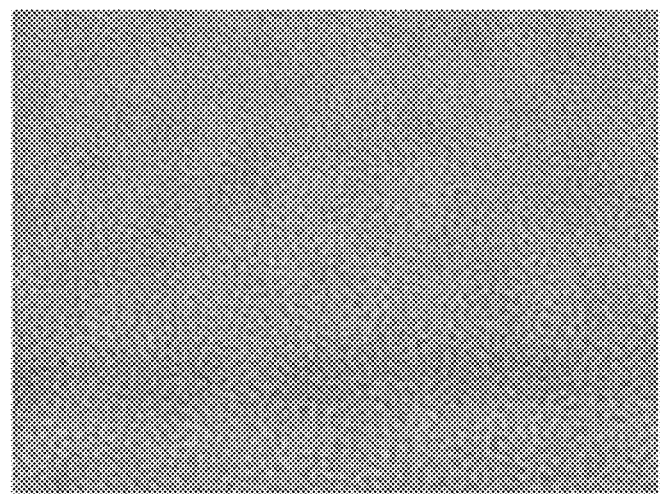
FIG. 4 is a photograph of the surface of a long film 12 when observed using a polarizing microscope.

FIG. 4 is a photograph of the surface of the long film 12 when observed using a polarizing microscope.

Since the spherulite radii of the long film 12 are small, the spherulites exist in a very dense manner, and unevenness in the surface thereof is thus small. Therefore, it is thought that the long film 12 has an uneven surface filled in during temporary lamination, and that expansion and detachment of the main long multilayer body due to high temperature soldering are thus controlled.

1-5-1. Production of Long Multilayer Body (Second)

In a roller-to-roller continuous process, plasma treatment (processing pressure: 30 Pa degree of vacuum, treating gas: argon gas (flow rate: 950 sccm) and hydrogen gas (flow rate: 50 sccm), processing power: 3 kw, processing time: 40 sec) is carried out on the surface of the long film 11.

A seed layer is formed on the plasma treated surface of the long film 11 through sputtering using the vapor phase growth method. Sputtering is carried out twice, where the target metal for the first time is a nickel chrome alloy and thickness of the forming layer is 10 nm, and metal for the second time is copper and thickness of the forming layer is 10 nm.

A copper layer (thickness: 12 μm) is formed on the surface of the seed layer formed on the long film 11 through the electrolytic plating method using copper sulfate, obtaining the long film 11 (a long multilayer body 10 including a conductive metal layer on the surface. Aside from changing the type of long film, a long multilayer body 1II is obtained from the long film 12, a long multilayer body 1III is obtained from the long film 13, and a long multilayer body 1IV is obtained from the long film 14, all of which are done in the same manner as the long multilayer body 1I.

1-5-2. Evaluation of Conductivity 100 transmission circuits (width: 50 μm, length: 100 mm) are formed in the conductive metal layer of each of the long multilayer bodies 1I to 1IV, resistance value on either end of the respective circuits is measured, and conductivity is evaluated in accordance with the following evaluation criteria.

[Evaluation Criteria]
- ○ (Good): Resistance values of all of the transmission circuits (100 circuits) are under 10Ω.
- Δ (Possible): 1 to 4 of the transmission circuits have a resistance value of 10Ω or greater.

x (Impossible): 5 or more of the transmission circuits have a resistance value of 10Ω or greater.

The obtained results are collected in the following Table 2.

TABLE 2

|  | Long multilayer body number | | | |
| --- | --- | --- | --- | --- |
|  | 1 I | 1 II | 1 III | 1 IV |
| Conductivity | Δ | o | Δ | x |

Since the long multilayer body 1IV is formed from a polymer film (long film 14) having large spherulite radii, and disconnection does not occur easily at interfaces of the transmission circuits and the polymer spherulites, it is thought that the number of transmission circuits having large resistance values increases.

2. Production Example and Evaluation Example (Second)

2-1. F Polymers

F polymers 2A: Copolymers (melting point: 305° C., MFR: 25 g/10 min) including 98.0 mol % of TFE units and 2.0 mol % of PPVE units in this order but not having a polar functional group F polymers 2B: Copolymers (melting point: 300° C., MFR: 20 g/10 min) including 98.0 mol % of TFE units, 1.9 mol % of PPVE units, and 0.1 mol % of NAH units in this order, and having a polar functional group F polymers 2C: Copolymers (melting point: 305° C., MFR: 5 g/10 min) including 98.0 mol % of TFE units and 2.0 mol % of PPVE units in this order but not having a polar functional group 2-2. Long Film 2-2-1. Production of Long Film (Long Film 21)

With the production apparatus illustrated in FIG. 1, aside from using an apparatus without the outer first cooling roller of the two first cooling rollers, using the F polymers 2A in place of the F polymers 1A, and setting the temperature of the medium of the first cooling roller to 200° C., a long film 21 (MFR: 27 g/10 min) having a thickness of 25 μm (draw ratio: 30) and a width of 500 mm is obtained in the same manner as in section '1-2-1'.

(Long Film 22)

Aside from using the F polymers 2B in place of the F polymers 2A, a long film 22 (MFR: 18 g/10 min) is obtained in the same manner as the long film 21.

(Long Film 23)

Aside from using the F polymers 2C in place of the F polymers 2A, a long film 23 is obtained in the same manner as the long film 21.

(Long Film 24)

Aside from setting the opening of the lip of the T-die to 1.5 mm (draw ratio: 60), a long film 24 is obtained in the same manner as the long film 21.

(Long Film 25 (Comparative Example))

Aside from omitting the ceramic heaters, a long film 25 is obtained in the same manner as the long film 21.

2-2-2. Evaluation of Long Film

A 12 cm angle square sample having two sides in the flow direction and the other two sides in the width direction is cut out from an end of the obtained long film in the width direction. 10 cm-long lines are then drawn along diagonal lines on the surface of the obtained sample. Next, this sample is placed and heated in a 180° C. oven for 30 minutes and then taken out so as to measure lengths of the lines drawn along the diagonal lines again, and to calculate the thermal expansion rates A and B in respective oblique directions.

2-3. Temporary Long Multilayer Body 2-3-1. Production of Temporary Long Multilayer Body A long copper foil and the long film 21 are laminated under the following conditions using the production apparatus illustrated in FIG. 2, producing a temporary long multilayer body 21 with a two-layer structure.

The surface temperature (laminate temperature) of paired laminate rollers (metal rollers) is set to 60° C. Moreover, pressure applied by the laminate rollers is set to 5 kN/m, and transport speed (laminate speed) of the copper foil and the long film 21 is set to 3 m/min.

Note that tension imparted to the copper foil is set to 200N, and tension imparted to the long film 21 is set to 20N.

Aside from using the long films 22 to 25 in place of the long film 21, respective temporary long multilayer bodies 22 to 25 are obtained in the same manner as the temporary long multilayer body 21.

2-3-2. Evaluation of Temporary Long Multilayer Body

Generation of wrinkles in the obtained temporary long multilayer body is visually confirmed, and evaluated in accordance with the following evaluation criteria.

[Evaluation Criteria]
- o (Good): Generation of wrinkles in the temporary long multilayer body is not confirmed.
- Δ (Possible): There are sagging portions in oblique directions of the long film before lamination, but generation of wrinkles in the temporary long multilayer body is not confirmed.
- x (Impossible): Wrinkles in oblique directions of the temporary long multilayer body are confirmed.

2-4. Main Long Multilayer Body 2-4-1. Production of Main Long Multilayer Body

Using the production apparatus illustrated in FIG. 3, two of the temporary long multilayer body 21 are laminated on a polyimide film (heat resistant resin film) under the following conditions such that the long films 21 are touching either side of the polyimide film, thereby obtaining a main long multilayer body 21.

The surface temperature (laminate temperature) of paired laminate rollers (metal rollers) is set to 360° C. Moreover, pressure applied by the laminate rollers is set to 5 kN/m, and transport speed (laminate speed) of the temporary long multilayer bodies 21 and the polyimide film is set to 1 m/min.

Aside from using the temporary long multilayer bodies 22 to 25 in place of the temporary long multilayer body 21, respective main long multilayer bodies 22 to 25 are obtained in the same manner as the main long multilayer body 21.

2-4-2. Evaluation of Main Long Multilayer Body

A dimensional stability test of the obtained main long multilayer body is conducted in conformity with JIS C 6481:1996.

A 30 cm angle square sample having two sides in the flow direction and the other two sides in the width direction is cut out from an end of the main long multilayer body in the width direction.

25 cm-long lines are drawn along diagonal lines (in a 45° direction where the angle to the flow direction is 45 degrees, and in a 135° direction that is orthogonal to the 45° direction) on the surface of this sample so as to form punch holes around either end parts of the respective lines. Two pieces of copper foil are then removed from the sample through etching using an iron chloride aqueous solution. Distance between centers of two punch holes located along the respective diagonal lines is measured before and after etching, so as to find thermal expansion rates in respective oblique directions of the sample after etching.

Moreover, once the sample is heated for 30 minutes in a hot air circulation oven of 150° C. and then cooled down to 25° C., distance between the centers of the two punch holes located along the respective diagonal lines is measured again, so as to find the thermal expansion rates in the respective oblique directions after heating. Note that the thermal expansion rates in the respective oblique directions after heating are values based on the distance between the centers of the two punch holes before etching.

2-5. Printed Wiring Board 2-5-1. Production of Printed Wiring Board

Using the main long multilayer body 21, a sample to be subjected to a thermal shock test of a copper-plated through hole is produced as a printed wiring board 21 in accordance with a method stipulated in JIS C 5016:1994.

Note that the through-hole diameter is set to 100 μm, and land diameter is set to 300 μm. Moreover, the through-hole is formed using a UV laser drilling system (Esi5330).

Aside from using the main long multilayer bodies 22 to 25 in place of the main long multilayer body 21, samples to be subjected to a thermal shock test are obtained as respective printed wiring boards 22 to 25 in the same manner as the printed wiring board 21.

2-5-2. Evaluation of Printed Wiring Board

The thermal shock test is conducted on the obtained samples. The thermal shock test repeatedly cools and heats the samples using a thermal shock chamber ('TSE-11-A' manufactured by Espec Corporation), with one cycle consisting of cooling at −65° C. for 30 minutes and heating at 125° C. for 30 minutes.

Resistance between end parts of vias (copper plated) within the through-hole is continuously measured using a voltmeter ('3540 mΩ HiTESTER' manufactured by Hioki E. E. Corporation) through the electrode 4-terminal method, and the number of cycles (number of disconnected cycles) in which resistance values have changed ±10% or greater from an initial value are confirmed.

The obtained results are collected in the following Table 3.

TABLE 3

|  | Long film or long multilayer body number | | | | |
|---|---|---|---|---|---|
|  | 21 | 22 | 23 | 24 | 25 |
| Type of F polymers | 2A | 2B | 2C | 2A | 2A |
| Provision of ceramic heaters | Yes | Yes | Yes | Yes | No |
| Draw ratio | 30 | 30 | 30 | 60 | 30 |
| Thermal expansion rate A [%]/Thermal expansion rate B [%] | −0.1/−0.3 | −1.0/−0.7 | −2.0/−1.4 | −2.0/−1.4 | +0.7/−1.8 |
| Difference in thermal expansion rate (\|A − B\|) [%] | 0.2 | 0.3 | 0.6 | 0.6 | 2.5 |
| Extent of wrinkles in temporary long multilayer body | ∘ | ∘ | Δ | Δ | x |
| Expansion rate of main long multilayer body [%] After etching | −0.03/−0.05 | −0.08/−0.05 | −0.12/−0.09 | −0.12/−0.09 | +0.06/−0.10 |
| Expansion rate of main long multilayer body [%] After heating | −0.05/−0.07 | −0.11/−0.08 | −0.16/−0.12 | −0.16/−0.12 | +0.07/−0.15 |
| Thermal shock test [number of cycles] | 800 | 700 | 500 | 500 | 80 |

INDUSTRIAL APPLICABILITY

The long multilayer body according to the present invention may be suitably used as printed wiring boards (particularly flexibly printed wiring boards), electromagnetic wave shield sheets, lithium-ion battery outer packages, etc.

DESCRIPTION OF REFERENCES

1: Long film, 2: Long substrate, 3: Second long substrate, 4: Heat resistant resin film, 10: Production apparatus, 20: T-die, 21: Lip, 30: First cooling roller, 40: Second cooling roller, 50: Winding roller, 61, 62: Transport roller, 70: Nip roller, 80: Heater, 100, 200: Production apparatus, 101: Laminate roller, 103: First delivery roller, 105: Second delivery roller, 107: Third delivery roller, t: Thickness, S: Peripheral speed, T1, T2, T3: Temperature, L, M, N: Long multilayer body

The invention claimed is:

1. A long film comprising at least 90 mass % of one or more thermomeltable polymers based on a total mass % of said long film, said one or more thermomeltable polymers comprising 80 to 99 mol % of a first unit based on tetrafluoroethylene, 1 to 20 mol % of a second unit based on a perfluoro (alkyl vinyl ether), and a third unit based on a monomer having a polar functional group selected from itaconic anhydride, citraconic anhydride, 5-norbornene-2,3-dicarboxylic anhydride and maleic anhydride, wherein the long film comprises spherulites of the one or more thermomeltable polymers, and wherein a radius of each spherulite is 10 μm or less.

2. The long film according to claim 1, wherein the one or more thermomeltable polymers further comprise a third unit based on a monomer having a polar functional group selected from itaconic anhydride, citraconic anhydride, and 5-norbornene-2,3-dicarboxylic anhydride.

3. The long film according to claim 1, wherein the one or more thermomeltable polymers comprise 2 to 4 mol % of a unit based on perfluoro (alkyl vinyl ether) as the second unit.

4. The long film according to claim 1, wherein a melt flow rate of the thermomeltable polymers is within a range of 5 to 40 g/10 min.

5. The long film according to claim 1, wherein a haze of the long film having a thickness of 50 μm is within a range of 1 to 5%.

6. A long multilayer body comprising the long film of claim 1 and a conductive metal layer.

7. The long film according to claim 1, wherein said long film has a melt flow rate within a range of 5 to 40 g/10 min, and wherein when the long film is heated at 180° C. for 30 minutes se as to measure the thermal expansion rate, a thermal expansion rate A in a first direction, which stretches at a 45-degree angle to a melt flow direction, and a thermal expansion rate B in a second direction orthogonal to the first direction, are such that A and B are respectively within the range of −2 to +1%, and |A−B| is 1% or less.

8. A long multilayer body comprising the long film of claim 2 and a conductive metal layer.

9. The long film according to claim 2, wherein said long film has a melt flow rate within a range of 5 to 40 g/10 min, and wherein when the long film is heated at 180° C. for 30 minutes to measure the thermal expansion rate, a thermal expansion rate A in a first direction, which stretches at a 45-degree angle to a melt flow direction, and a thermal expansion rate B in a second direction orthogonal to the first direction, are such that A and B are respectively within the range of −2 to +1%, and |A−B| is 1% or less.

10. The long film according to claim 1, wherein the radius of each spherulite is 0.2-7.5 μm.

11. The long film according to claim 2, wherein the radius of each spherulite is 0.2-7.5 μm.

12. The long film according to claim 1, comprising 100 mass % of said one or more thermomeltable polymers based on a total mass % of said long film.

13. The long film according to claim 2, comprising 100 mass % of said one or more thermomeltable polymers based on a total mass % of said long film.

14. A long film comprising at least 90 mass % of one or more thermomeltable polymers based on a total mass % of said long film, said one or more thermomeltable polymers comprising a first unit based on tetrafluoroethylene, a second unit based on a perfluoro (alkyl vinyl ether), and a third unit based on monomers having a polar functional group selected from itaconic anhydride, citraconic anhydride, 5-norbornene-2,3-dicarboxylic anhydride and maleic anhydride, wherein:
 the mol % of the first unit, the mol % of the second unit, and the mol % of the third unit in the one or more thermomeltable polymers are 90 to 99 mol %, 0.5 to 9.97 mol %, and 0.01 to 3 mol %, respectively,
 the long film comprises spherulites of the one or more thermomeltable polymers, and
 a radius of each spherulite is 10 μm or less.

15. The long film according to claim 14, wherein the third unit is based on monomers having a polar functional group selected from itaconic anhydride, citraconic anhydride, and 5-norbornene-2,3-dicarboxylic anhydride.

\* \* \* \* \*